US011522356B1

(12) United States Patent
Atienza et al.

(10) Patent No.: US 11,522,356 B1
(45) Date of Patent: Dec. 6, 2022

(54) POWER SUPPLY OVERCURRENT EVENT RECOVERY METHOD AND SYSTEM

(71) Applicant: APPLETON GRP LLC, Rosemont, IL (US)

(72) Inventors: Joel Jeremiah Guevarra Atienza, Bulacan (PH); John Rommel Baduel De Robles, Laguna (PH); Mark Chester Bernardino Nepomuceno, Rizal (PH)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 17/511,214

(22) Filed: Oct. 26, 2021

(51) Int. Cl.
*H02H 7/12* (2006.01)
*H02H 3/06* (2006.01)
*H02H 3/087* (2006.01)

(52) U.S. Cl.
CPC .......... *H02H 7/1213* (2013.01); *H02H 3/066* (2013.01); *H02H 3/087* (2013.01)

(58) Field of Classification Search
CPC .... H02J 1/10; H02J 1/102; H02J 1/106; H02J 2001/104; H02H 3/06; H02H 3/063; H02H 3/066; H02H 3/07; H02H 7/1213; H02H 3/087
See application file for complete search history.

(56) References Cited

U.S. PATENT DOCUMENTS

| 4,363,064 | A | 12/1982 | Billings et al. |
| 5,157,269 | A | 10/1992 | Jordan et al. |
| 5,745,356 | A | 4/1998 | Tassitino, Jr. et al. |
| 6,411,483 | B1 | 6/2002 | Sarles et al. |
| 6,608,402 | B2* | 8/2003 | Soo .......... H02J 1/001 307/53 |
| 6,768,295 | B2 | 7/2004 | Santin et al. |
| 7,002,263 | B2 | 2/2006 | Inn et al. |
| 7,113,379 | B2* | 9/2006 | Matsumoto ........ H02H 3/06 361/57 |
| 7,116,563 | B2 | 10/2006 | Hua |
| 8,120,204 | B2 | 2/2012 | Moon et al. |
| 8,552,704 | B2 | 10/2013 | Kiadeh et al. |
| 9,496,780 | B2 | 11/2016 | Warnes |
| 9,620,951 | B2 | 4/2017 | Syngaevskiy et al. |

(Continued)

*Primary Examiner* — Jared Fureman
*Assistant Examiner* — Christopher J Clark
(74) *Attorney, Agent, or Firm* — McDonnell Boehnen Hulbert & Berghoff LLP

(57) ABSTRACT

A power supply comprises voltage regulation circuitry, a load-share controller, and overcurrent protection circuitry. The voltage regulation circuitry is configured to output a regulated voltage. The load-share controller is configured to control the voltage regulation circuitry to adjust the regulated voltage responsive to a load-share voltage signal (LSV) that indicates an amount of load current being delivered to a load. The overcurrent protection circuitry is configured to selectively couple the regulated voltage to the load. When the load current exceeds a threshold current, the overcurrent protection circuitry is configured to decouple the regulated voltage from the load. While the regulated voltage is decoupled from the load, and when the LSV signal indicates that load current is being delivered to the load by a different power supply, the overcurrent protection circuitry is configured to recouple the regulated voltage to the load.

20 Claims, 6 Drawing Sheets

(56) References Cited

U.S. PATENT DOCUMENTS

| | | |
|---|---|---|
| 9,906,143 B1 | 2/2018 | Yu et al. |
| 10,848,051 B2 | 11/2020 | Yan et al. |
| 10,998,722 B2 | 5/2021 | Song |
| 2020/0251924 A1 | 8/2020 | Mohr et al. |

\* cited by examiner

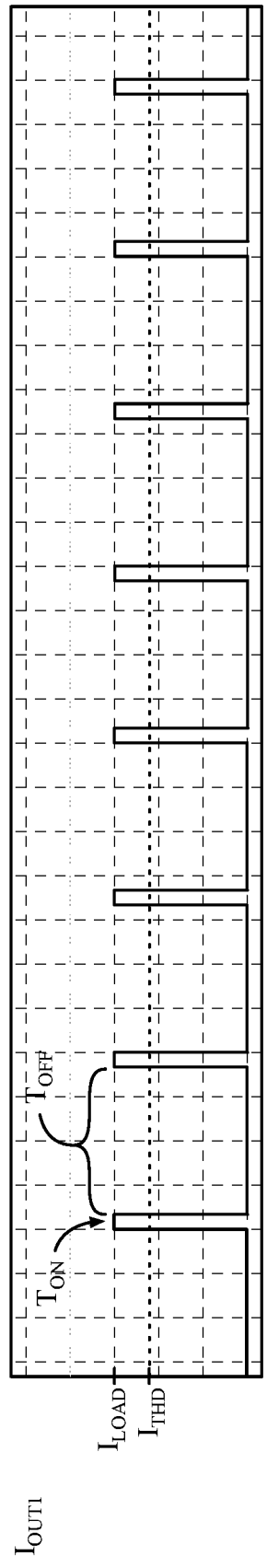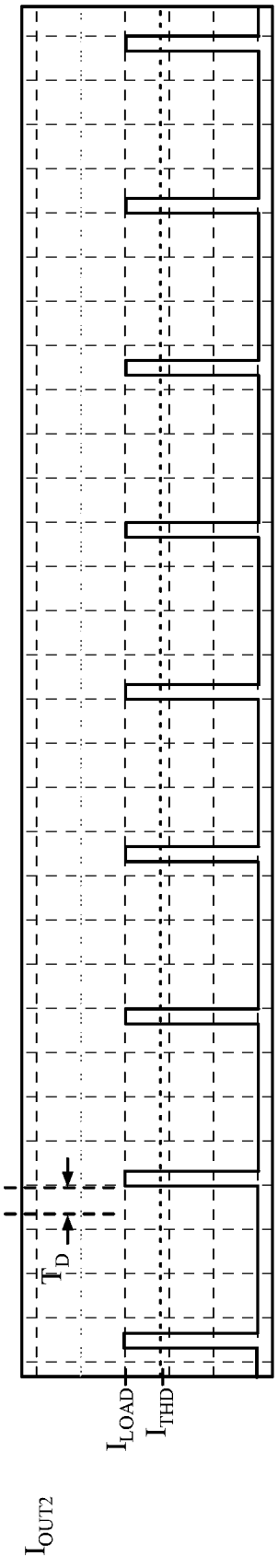

POWER SUPPLY OVERCURRENT EVENT RECOVERY METHOD AND SYSTEM

BACKGROUND

Field

This application generally relates to power supply systems in electronic devices. In particular, this application describes load-sharing power supplies and techniques implemented by the power supplies that facilitate recovery from a hiccup mode of operation that occurs due to an overcurrent protection event.

Description of Related Art

A power supply is an electrical device that supplies power to an electrical load. The primary function of a power supply is to convert electric energy from a source to an appropriate voltage, current, and frequency to power the load. Some power supplies are configured to be coupled in parallel to facilitate driving a load current that is beyond the capacity of a single power supply.

Some power supplies include protection circuitry configured to decouple power to the load in the event of an overcurrent condition. Some examples of the protection circuitry enter a hiccup mode of operation when such an event occurs. During hiccup mode, the protection circuitry controls the power supply to decouple power to the load either immediately or after a pre-defined debounce time has elapsed. After a predetermined period, the power supply is recoupled to the load to resume normal operations. However, if the overcurrent condition persists, these operations repeat until the fault that is causing the overcurrent condition is cleared.

SUMMARY

In a first aspect, a power supply comprises voltage regulation circuitry, a load-share controller, and overcurrent protection circuitry. The voltage regulation circuitry is configured to output a regulated voltage. The load-share controller is configured to control the voltage regulation circuitry to adjust the regulated voltage responsive to a load-share voltage signal (LSV) that indicates an amount of load current being delivered to a load. The overcurrent protection circuitry is configured to selectively couple the regulated voltage to the load. When the load current exceeds a threshold current, the overcurrent protection circuitry is configured to decouple the regulated voltage from the load. While the regulated voltage is decoupled from the load, and when the LSV signal indicates that load current is being delivered to the load by a different power supply, the overcurrent protection circuitry is configured to recouple the regulated voltage to the load.

In a second aspect, a computing system comprises one or more processors, one or more memories, and a plurality of power supplies. The one or more memories store instruction code that is executable by the one or more processors for controlling the computing system to perform one or more operations. The power supplies are configured to be electrically coupled in parallel to one another to supply power to a load that comprises at least one of the one or more processors. Each power supply comprises voltage regulation circuitry, a load-share controller, and overcurrent protection circuitry. The voltage regulation circuitry is configured to output a regulated voltage. The load-share controller is configured to control the voltage regulation circuitry to adjust the regulated voltage responsive to a load-share voltage signal (LSV) that indicates an amount of load current being delivered to the load. The overcurrent protection circuitry is configured to selectively couple the regulated voltage to the load. When the load current exceeds a threshold current, the overcurrent protection circuitry is configured to decouple the regulated voltage from the load. While the regulated voltage is decoupled from the load, and when the LSV signal indicates that load current is being delivered to the load by a different power supply, the overcurrent protection circuitry is configured to recouple the regulated voltage to the load.

In a third aspect, a method for operating a power supply comprises providing, by voltage regulation circuitry of the power supply, a regulated voltage. The method further comprises controlling, by a load-share controller of the power supply, the voltage regulation circuitry to adjust the regulated voltage responsive to a load-share voltage signal (LSV) that indicates an amount of load current being delivered to a load. When the load current exceeds a threshold current, the method comprises decoupling, by overcurrent protection circuitry of the power supply, the regulated voltage from the load. While the regulated voltage is decoupled from the load, and when the LSV signal indicates that load current is being delivered to the load by a different power supply, the method comprises recoupling, by the overcurrent protection circuitry, the regulated voltage to the load.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 4A illustrates an output current waveform of a first power supply when hiccup mode recovery is not implemented, in accordance with example embodiments.

FIG. 4B illustrates an output current waveform of a second power supply when hiccup mode recovery is not implemented, in accordance with example embodiments.

DETAILED DESCRIPTION

Figure 1:
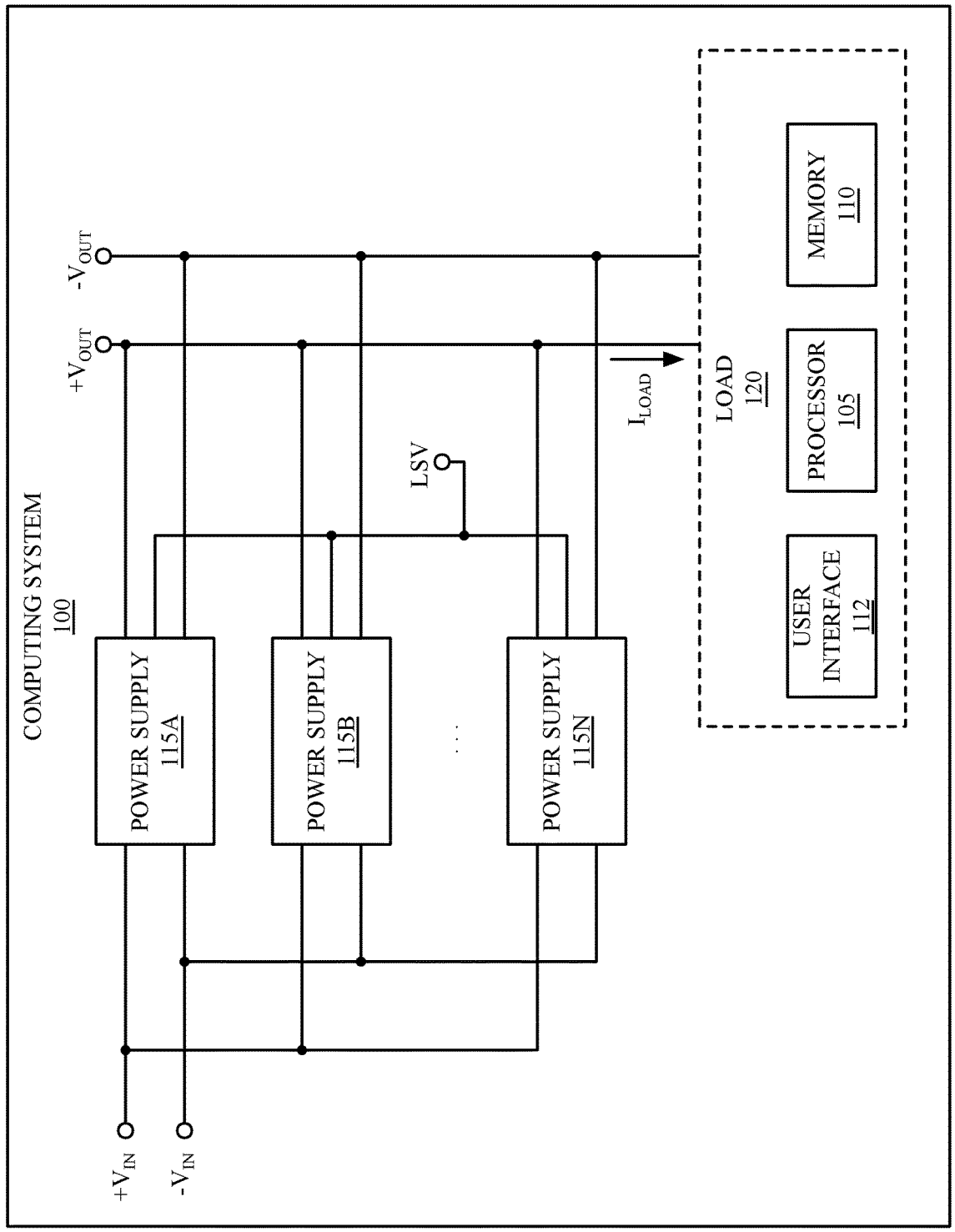
FIG. 1 illustrates a computing system, in accordance with example embodiments.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein are meant that the recited characteristic, parameter, or value need not be achieved exactly, but that deviations or variations, including, for example, tolerances, measurement error, measurement accuracy limitations and other factors known to skill in the art, may occur in amounts that do not preclude the effect the characteristic was intended to provide.

Further, terms such as "A coupled to B," "A is electrically coupled to B," etc., do not necessarily mean that items A and B are directly coupled to one another. For example, a first component electrically coupled to a second component is interpreted to mean that the components are either directly coupled (e.g., via a conductor) or coupled to one another via one or more resistors, capacitors, inductors, transistors, amplifiers, and/or other active or passive components.

I. INTRODUCTION

As noted above, some power supplies enter a hiccup mode of operation when the overcurrent protection (OCP) circuitry of these power supplies detects an overcurrent condition. To mitigate this issue, some power supplies include circuitry that facilitates parallel coupling of power supplies to drive additional load current. For example, two power supplies can be coupled in parallel to double the available load current.

However, the respective hiccup mode operations of the two power supplies are not synchronized and, therefore, the power supplies may not turn on at the same time (e.g., due to component tolerances). When this occurs, the first power supply to turn on will source all the load current, which can cause an overcurrent condition that triggers the first power supply to enter hiccup mode, where the first power supply cycles between on and off states. If the first power supply is in the off state when the second power supply turns on, the second power supply will source all the load current, which can cause an overcurrent condition that triggers the second power supply to enter hiccup mode. This power supply startup issue will persist until the on states of two power supplies synchronize, which in some circumstances can take a significant amount of time.

Examples of power supplies that help ameliorate these and other issues are described below. Some examples of power supplies include voltage regulation circuitry, a load-share controller, and overcurrent protection circuitry. The voltage regulation circuitry is configured to output a regulated voltage. The load-share controller is configured to control the voltage regulation circuitry to adjust the regulated voltage responsive to a load-share voltage (LSV) signal that indicates an amount of load current being delivered to a load. The LSV signal flows in a common signal bus that is electrically coupled to power supplies that are in parallel with one another. The overcurrent protection circuitry is configured to selectively couple the regulated voltage to the load. When the load current exceeds a threshold current, the overcurrent protection circuitry is configured to decouple the regulated voltage from the load. While the regulated voltage is decoupled from the load and when the LSV signal indicates that load current is being delivered to the load (e.g., by another power supply), the overcurrent protection circuitry is configured to recouple the regulated voltage to the load.

For instance, some examples of the overcurrent protection circuitry are configured to immediately recouple the regulated voltage to the load or to do so before the second power supply enters hiccup mode. For instance, if the respective hiccup modes for first and second parallel coupled power supplies are characterized as having a one-second on-time, the overcurrent protection circuitry of the first power supply recouples the regulated voltage to the load within one second of detecting, via the LSV signal, that the load is being driven by the second power supply.

FIG. 1 illustrates an example of a computing system 100. The computing system 100 comprises a processor 105, a memory 110, and a plurality of power supplies 115A, 115B, and 115N. Some examples of the computing system 100 further comprise a user interface 112. The processor 105, the memory 110, and user interface 112 form at least part of a load 120 of the computing system 100.

Some examples of the processor 105 are in communication with the memory 110 and are configured to execute instruction code stored in the memory 110. The memory 110 stores instruction code that is executable by the processor 105 for controlling the computing system 100 to perform one or more operations. Some examples of the processor 105 correspond to Intel®, AMD®, ARM®, PowerPC®, etc. processors. Some examples of the instruction code implement an operating system, such as Linux®, Android®, etc. The instruction code facilitates performing, by the computing system 100, various operations. In this regard, the instruction code can cause the processor 105 to control and coordinate various activities performed by the different subsystems of the computing system 100.

Some examples of the user interface 112 comprise display circuitry, audio circuitry, user input circuitry, etc. Some examples of the display circuitry include a liquid crystal display (LCD), light-emitting diode display (LED) display, etc. Some examples of the display include a transparent capacitive touch that facilitates receiving user commands. In this regard, some examples of the display circuitry are configured to present a graphical user interface (GUI) that facilities specifying, by the user, information. Some examples of the audio circuitry include one or more digital-to-analog converters (DAC), analog-to-digital converters (ADC), amplifiers, speakers, microphones, etc.

As illustrated, a first power supply 115A is configured to be electrically coupled to a second power supply 115B in a parallel configuration to facilitate powering a common load 120. Some examples of the power supply 115 are configured to convert a line voltage (e.g., $+V_{IN}$, $-V_{IN}$) to a regulated voltage (e.g., $+V_{OUT}$, $-V_{OUT}$), capable of providing power to the load 120 of the computing system 100. Some examples of the power supplies 115 include a load-share voltage terminal configured to receive or output a load-share voltage (LSV) signal. As described in more detail below, the LSV signal facilitates controlling each of the power supplies 115 to output a portion of the load current, $I_{LOAD}$, to the load 120.

Figure 2:
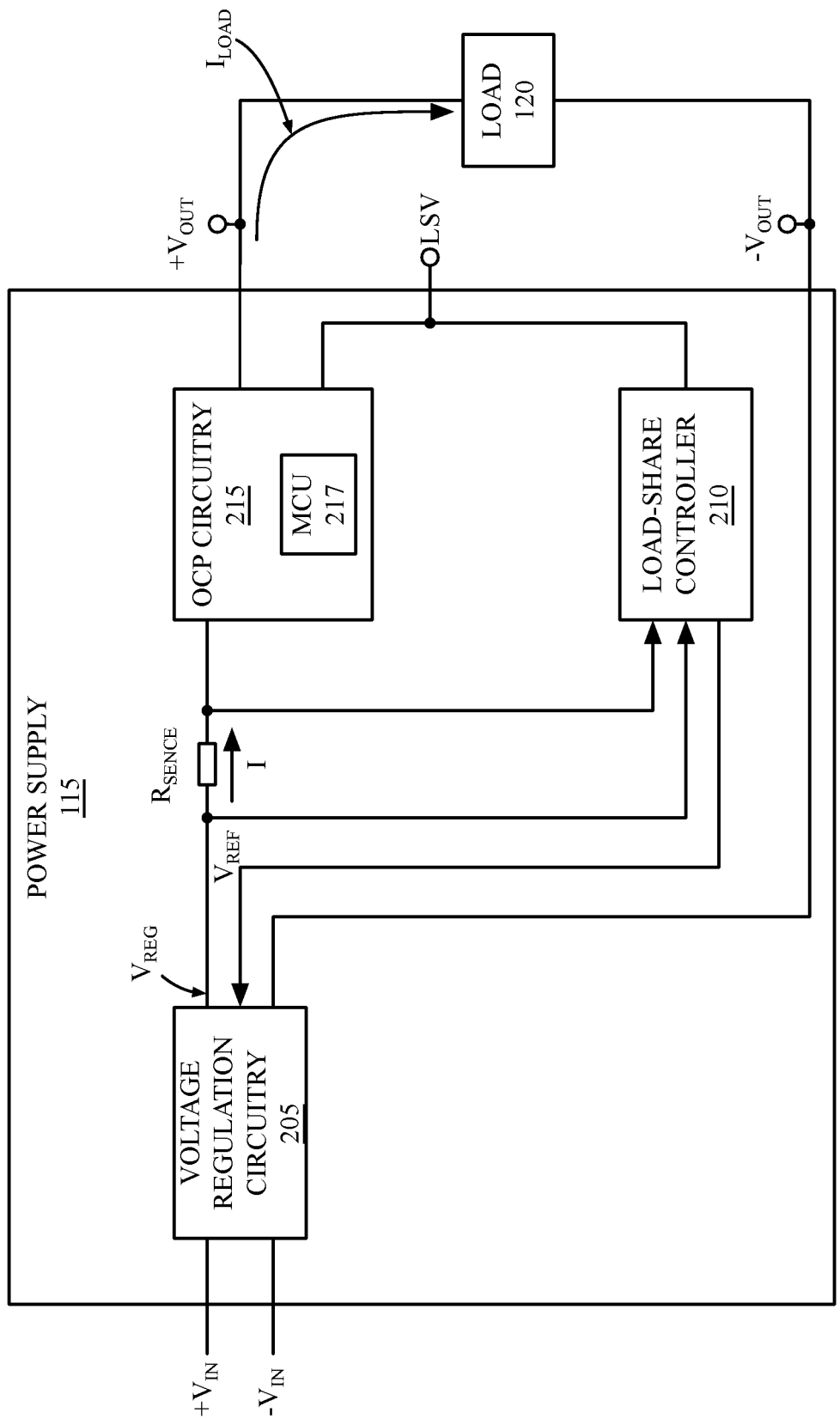
FIG. 2 illustrates a power supply, in accordance with example embodiments.

FIG. 2 illustrates an example of a power supply 115, which can correspond to one or more of the power supplies 115A, 115B, and 115N illustrated in FIG. 1. Some examples of the power supply 115 comprise voltage regulation circuitry 205, a load-share controller 210, and overcurrent protection circuitry 215.

Some examples of the voltage regulation circuitry 205 comprise a voltage source input terminal configured to be electrically coupled to a voltage source (e.g., $+V_{IN}$, $-V_{IN}$) and a regulated voltage output terminal through which a regulated voltage, $V_{REG}$, is provided. For instance, in an example, the voltage source input terminal is electrically coupled to a line voltage (e.g., 120 VAC, 240 VAC, a DC voltage, etc.), and the regulated voltage output terminal provides, e.g., ±5 VDC, ±12 VDC, ±24 VDC, etc. An example of the voltage regulation circuitry 205 corresponds to a linear regulator, a switch-mode regulator, etc., or a combination thereof that is configured to output a regulated voltage.

Some examples of the load-share controller 210 are configured to control the voltage regulation circuitry 205 to adjust the regulated voltage, $V_{REG}$, provided via the regulated voltage output terminal responsive to a load-share voltage signal (LSV) that indicates an amount of load current, $I_{LOAD}$, being delivered to the load 120. In this regard, some examples of the voltage regulation circuitry 205 include a reference voltage input. A particular reference voltage, $V_{REF}$, provided at the reference voltage input controls the voltage regulation circuitry 205 to output a particular voltage that is generally proportional to the reference voltage. In some examples, the load-share controller 210 includes a reference voltage output that is configured to be electrically coupled to the reference voltage input of the voltage regulation circuitry 205 and, via this output, the load-share controller 210 adjusts the voltage at the reference voltage input to control the voltage regulation circuitry 205 to output a particular regulated voltage, $V_{REG}$.

Some examples of the load-share controller 210 are configured to sense the amount of current that flows from the regulated voltage output terminal of the voltage regulation circuitry 205. In this regard, in some examples, a sense resistor, $R_{SENSE}$, is electrically coupled in series with the regulated voltage output terminal of the voltage regulation circuitry 205. Current that flows through the sense resistor, $R_{SENSE}$, generates a voltage across the sense resistor. Some examples of the load-share controller 210 include input terminals that are configured to be electrically coupled to respective nodes of the sense resistor, $R_{SENSE}$, to facilitate sensing the voltage across the sense resistor.

Some examples of the load-share controller 210 internally generate an LSV signal that is proportional to the amount of current sensed via the sense resistor, $R_{SENSE}$. Some examples of the load-share controller 210 include a bi-directional LSV terminal through which the internally generated LSV signal is output, or through which an LSV signal generated by a different power supply 115 is received.

In operation, the load-share controller 210 is configured to adjust the regulated voltage, $V_{REG}$, that is output by the voltage regulation circuitry 205 based on the difference between the internally generated LSV signal and the LSV signal received at the LSV terminal.

When the power supply 115 is in a standalone configuration (i.e., not in parallel with other power supplies), the LSV signal at the LSV terminal generally corresponds to the internally generated LSV signal. The difference between these LSV signals is essentially zero. Therefore, the regulated voltage, $V_{REG}$, that is output by the voltage regulation circuitry 205 is not adjusted by the load-share controller 210 based on an amount of current being provided by the voltage regulation circuitry 205.

When a first power supply 115A and a second power supply 115B are used in combination as, for example, illustrated in FIG. 1, a signal at the LSV terminal of the first power supply 115A that is greater than the internally generated LSV signal of the first power supply 115A indicates that the second power supply 115B is contributing more to the load current, $I_{LOAD}$, than the first power supply 115A. In this case, the load-share controller 210 of the first power supply 115A increases the regulated voltage, $V_{REG}$, that is output from the voltage regulation circuitry 205 of the first power supply 115A to increase the amount of current contributed by the voltage regulation circuitry 205 until the amount of current contributed by the voltage regulation circuitry 205 of the first power supply 115A is the same as or within a margin of the amount of current contributed by the voltage regulation circuitry 205 of the second power supply 115B.

Some examples of the overcurrent protection circuitry 215 include an input terminal configured to be electrically coupled to the regulated voltage output terminal of the voltage regulation circuitry 205 and an output terminal (e.g., $+V_{OUT}$) that is configured to be electrically coupled to the load 120. In some examples, the input terminal is electrically coupled to the regulated voltage output terminal of the voltage regulation circuitry 205 via the sense resistor, $R_{SENSE}$.

Some examples of the overcurrent protection circuitry 215 include an LSV terminal that is configured to be electrically coupled to the LSV signal to facilitate sensing the load current, $I_{LOAD}$, that flows through the load 120. In these examples, the overcurrent protection circuitry 215 compares the LSV signal with a threshold voltage associated with an overcurrent condition to determine whether an overcurrent condition exists.

Some examples of the overcurrent protection circuitry 215 are configured to selectively couple the regulated voltage output terminal of the voltage regulation circuitry 205 to the load 120 in a manner that prevents the voltage regulation circuitry 205 from entering an overcurrent condition. In this regard, some examples of the overcurrent protection circuitry 215 comprise a semiconductor switch (e.g., metal-oxide field-effect transistor, bipolar junction transistor, etc.) that is electrically coupled in between and to the input terminal and the output terminal of the overcurrent protection circuitry 215.

Some examples of the overcurrent protection circuitry 215 control the power supply 115 to enter a hiccup mode of operation when the amount of current contributed by the voltage regulation circuitry 205 to the load current, $I_{LOAD}$, exceeds a threshold current. During the hiccup mode of operation, the regulated voltage output terminal of the voltage regulation circuitry 205 is electrically coupled to the load 120 for a particular ON interval (e.g., 0.5 seconds) and decoupled from the load 120 for a particular OFF interval (e.g., 3.0 seconds). In some examples, this sequence repeats until the fault causing the overcurrent condition is removed.

As noted above, the hiccup modes of operation performed by conventional power supplies are not synchronized, which can cause power supply startup issues. Some examples of the overcurrent protection circuitry 215 implement recovery techniques that ameliorate this issue. For instance, in some examples, if during the OFF interval, the LSV signal indicates that load current, $I_{LOAD}$, is being delivered to the load 120 (e.g., by a different power supply), the overcurrent protection circuitry 215 is configured to recouple the regulated voltage output terminal of the voltage regulation circuitry 205 to the load 120. For example, after determining that a load current, $I_{LOAD}$, is being delivered to the load 120, the overcurrent protection circuitry 215 of a first power supply 115 is configured to immediately, or within the $T_{ON}$ interval of a second power supply, recouple the regulated voltage output terminal of the voltage regulation circuitry 205 to the load 120 rather than maintain the regulated voltage output terminal in a decoupled state for the duration of the $T_{OFF}$ interval.

In some instances, however, the load current, $I_{LOAD}$, may nevertheless exceed the combined current driving capabilities of parallel power supplies. Therefore, in some examples, the recovery attempt described above is configured to occur a limited number of times (e.g., 100 times) during the $T_{OFF}$ interval. After these attempts, the overcurrent protection circuitry 215 is configured to cease further detection of the LSV signal during the $T_{OFF}$ interval until, for example, the power supply 115 is reset (e.g., a reset switch is actuated, the source of power is removed, etc.). This aspect protects the power supply from component stress brought on by repetitive re-coupling attempts during an overcurrent condition.

Some examples of the overcurrent protection circuitry 215 include a microcontroller 217 that executes instruction code (e.g., firmware) that controls the overcurrent protection circuitry 215 to perform the operations above. Some examples of the microcontroller 217 include an analog-to-digital (ATOD) input configured to sense the VLS signal and an output configured to control the state of the switch described above. In operation, the microcontroller 217 compares the VLS signal to a threshold value indicative of an overcurrent condition. If an overcurrent condition exists, the microcontroller controls the switch to cause the power supply 115 to enter a hiccup mode of operation. If during an off interval, the VLS signal starts to be above a threshold that indicates load current, $I_{LOAD}$, is flowing to the load (e.g., from a different power supply), the microcontroller 217 controls the switch to close to facilitate hiccup mode recovery.

Figure 3:
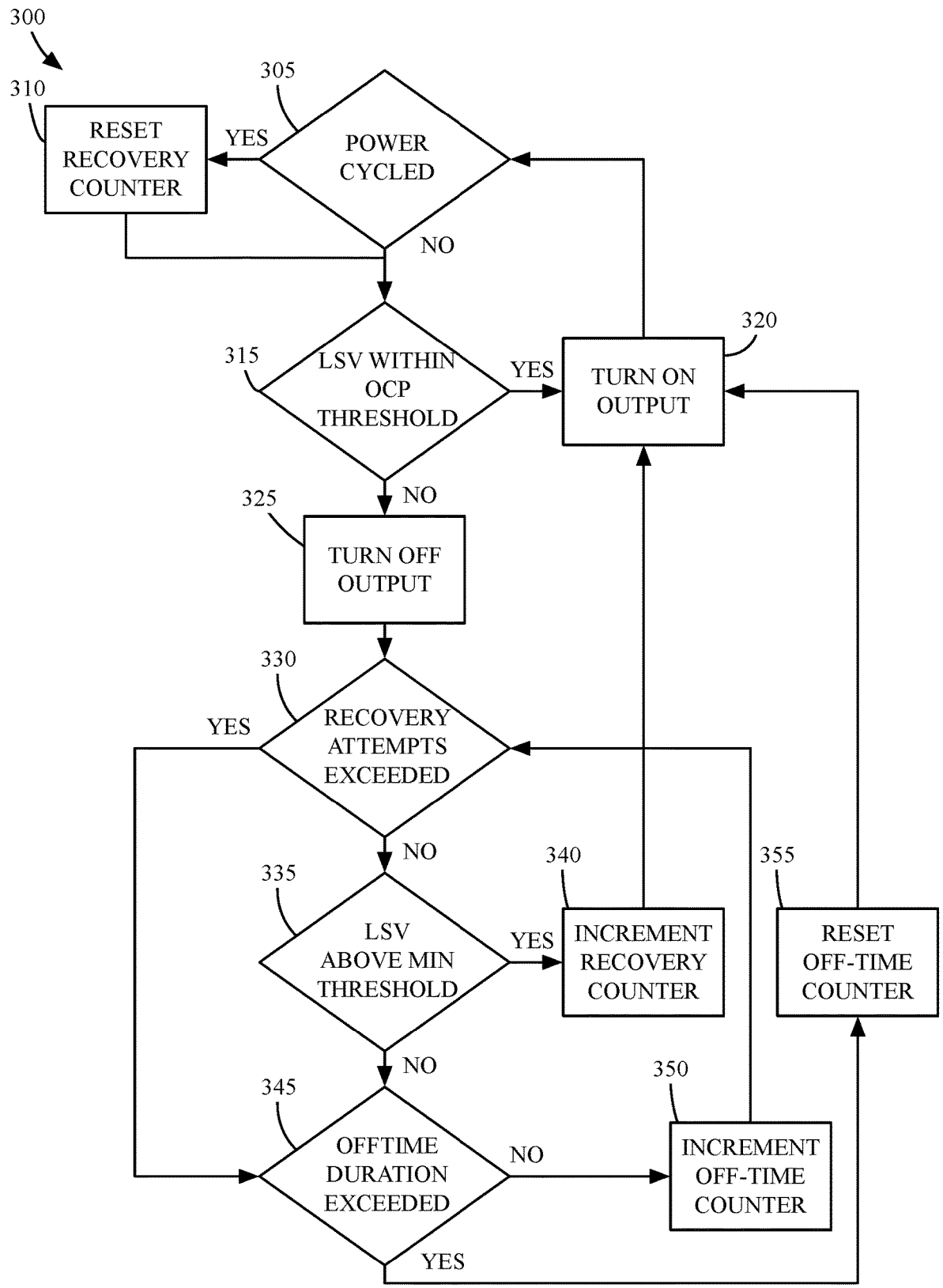
FIG. 3 illustrates operations performed by overcurrent protection circuitry of the power supply, in accordance with example embodiments.

FIG. 3 illustrates operations 300 performed by some examples of the overcurrent protection circuitry 215. In some examples, one or more of these operations are performed by the microcontroller 217 described above.

The operations at block 305 involve determining whether the power supply 115 has been power cycled (e.g., electrically coupled to a power source, turned on via a switch, etc.). If at block 305 the power supply 115 has been power cycled, then at block 310, a recovery counter is reset.

The operations at block 315 involve determining whether the LSV signal is within the overcurrent protection threshold. In some examples, this involves comparing the LSV signal with a threshold voltage that is associated with the overcurrent protection threshold. If at block 315, the LSV signal is determined to be within the overcurrent protection threshold, then at block 320, the power supply 115 output is turned on, and the operations at block 305 repeat. For example, the switch of the overcurrent protection circuitry 215 is controlled (e.g., via the microcontroller) to close so that the regulated voltage output terminal of the voltage regulation circuitry 205 is electrically coupled to the load 120.

If at block 315, the LSV signal is determined to be above the overcurrent protection threshold, then at block 325, the power supply 115 output is turned off. For example, the switch of the overcurrent protection circuitry 215 is controlled (e.g., via the microcontroller) to open so that the regulated voltage output terminal of the voltage regulation circuitry 205 is no longer electrically coupled to the load 120.

If at block 330, the number of hiccup mode recovery attempts, as indicated by the recovery counter, is below a threshold count (e.g., less than ten recovery attempts), then if at block 335, the LSV signal is at or above a minimum threshold that indicates that load current, $I_{LOAD}$, is being provided to the load 120 (e.g., by another power supply), then at block 340, the recovery counter is incremented, and the operations continue from block 320 where the output is turned on.

If at block 335 the LSV signal is below the minimum threshold that indicates that load current, $I_{LOAD}$, is being provided to the load 120 (e.g., by another power supply), then if at block 345 the off-time duration of the power supply 115 has not been exceeded (e.g., off time is less than 3.0 seconds), then at block 350, an off-time counter is incremented and the operations at block 330 repeat.

If at block 345 the off-time duration of the power supply 115 has been exceeded (e.g., off-time is greater than equal to 3.0 seconds), then at block 355, the off-time counter is reset, and the operations continue from block 320 where the output is turned on.

If at block 330, the number of hiccup mode recovery attempts, as indicated by the recovery counter, is at the threshold count (e.g., ten recovery attempts), then the operations will proceed to block 345 to skip detection of LSV signal while the output is turned off. The off-time counter at block 345 continues to increment until the duration threshold is exceeded, after which the operations will continue from block 320 where the output is turned on.

FIGS. 4A and 4B illustrate examples of current output waveforms associated with a first power supply 115A and a second power supply 115B when hiccup mode recovery is not implemented, respectively. Referring to FIG. 4A, during hiccup mode, the first power supply 115A turns on during on interval $T_{ON}$ and turns off during off interval $T_{OFF}$. The period of the hiccup mode generally equals $T_{ON}+T_{OFF}$. For example, during the ON interval, the switch of the overcurrent protection circuitry 215 of the first power supply 115A is closed. When the switch is in this state, the regulated voltage output terminal of the voltage regulation circuitry 205 is electrically coupled to load 120 and, therefore, the voltage regulation circuitry 205 of the first power supply 115A drives all the load current, $I_{LOAD}$, into the load 120. The load current in this example exceeds the threshold current, $I_{THD}$, of the voltage regulation circuitry 205 of the first power supply 115A. This, in turn, causes the switch to open after the ON interval. During the off interval, the regulated voltage output terminal of the voltage regulation circuitry 205 is decoupled from load 120.

In some examples, intervals $T_{ON}$ and $T_{OFF}$ are predetermined to control/limit the amount of time the power supply 115 may spend driving a load current, $I_{LOAD}$, that exceeds a nominal/continuous current rating of the power supply 115.

For instance, in an example, $T_{ON}$ is set to 0.5 seconds and $T_{OFF}$ is set to 3.0 seconds. In other examples, the length of $T_{ON}$ and $T_{OFF}$ are dynamically controlled (e.g., the duty cycle is adjusted) so that the average load current output by the power supply 115 does not exceed the nominal/continuous current rating of the power supply 115.

Referring to FIG. 4B, during hiccup mode, the second power supply 115B turns on during an ON interval and turns off during an OFF interval. The period of the hiccup mode generally equals time associated with the sum of the two intervals. In some examples, the ON and OFF intervals match the corresponding intervals associated with the first power supply 115A. In other examples, the ON and OFF intervals are different.

As illustrated, the ON interval of the first power supply 115A is offset from the ON interval of the second power supply 115B by time $T_D$. Therefore, each power supply 115 independently attempts to drive a load current, $I_{LOAD}$, that exceeds the nominal/continuous current rating or current threshold, $I_{THD}$, of the respective power supplies 115, causing each power supply 115 to decouple from the load 120 during respective OFF intervals and to remain in hiccup mode. This condition will generally persist until the respective ON intervals align with one another.

Figure 5A:
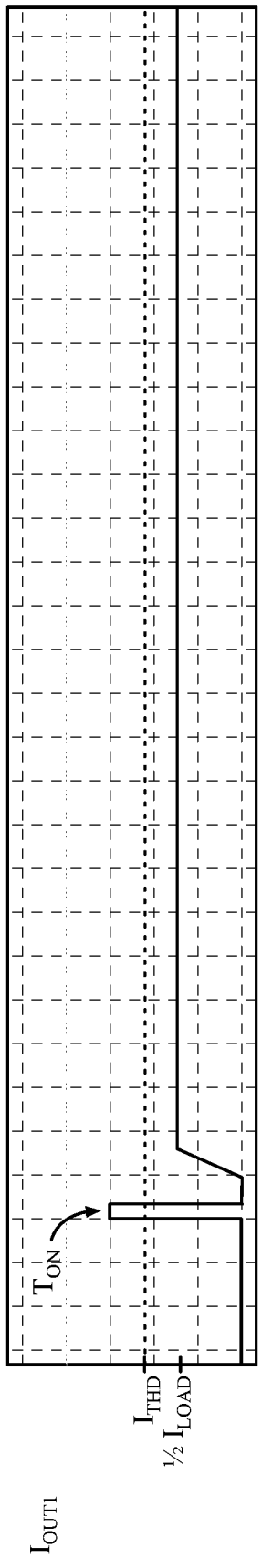
FIG. 5A illustrates an output current waveform of a first power supply that implements hiccup mode recovery, in accordance with example embodiments.
Figure 5B:
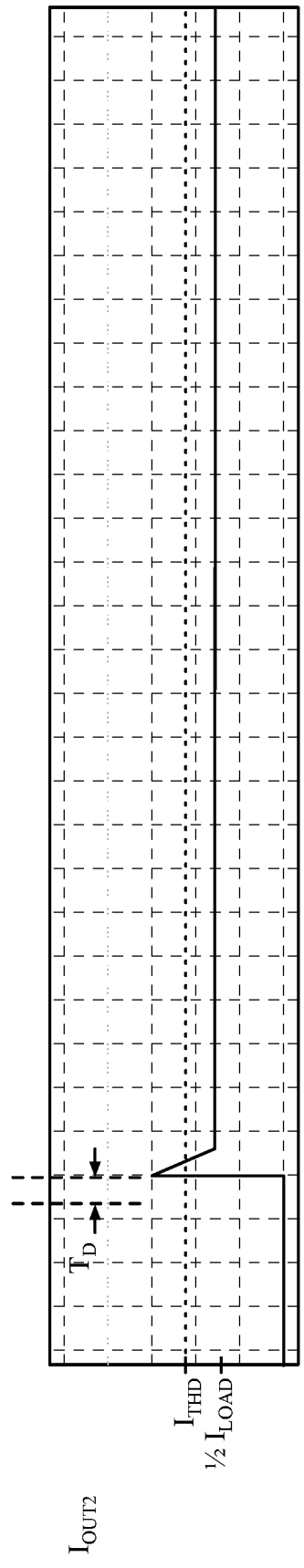
FIG. 5B illustrates an output current waveform of a second power supply that implements hiccup mode recovery, in accordance with example embodiments.

FIGS. 5A and 5B illustrate examples of current output waveforms associated with a first power supply 115A and a second power supply 115B that implement the hiccup mode recovery techniques described above, respectively. Referring to FIG. 5A, during the ON interval, the switch of the overcurrent protection circuitry 215 of the first power supply 115A is closed. When the switch is in this state, the regulated voltage output terminal of the voltage regulation circuitry 205 is electrically coupled to load 120 and, therefore, the voltage regulation circuitry 205 of the first power supply 115A drives all the load current, $I_{LOAD}$, into the load 120. The load current in this example exceeds the threshold current, $I_{THD}$, of the voltage regulation circuitry 205 of the first power supply 115A. This, in turn, causes the switch to open after the ON interval.

As shown in FIG. 5B, about $T_D$ seconds later, the switch of the overcurrent protection circuitry 215 of the second power supply 115B closes and the second power supply 115B begins its ON interval. However, before the OFF interval of the second power supply 115B begins, the overcurrent protection circuit 215 of the first power supply 115A determines, via the LSV signal, that load current, $I_{LOAD}$, is flowing into the load 120 from the second power supply 115B. Therefore, the overcurrent protection circuit 215 of the first power supply 115A couples the voltage regulation circuitry 205 of the first power supply 115A to the load 120. As a result, the first power supply 115A and the second power supply 115B simultaneously drive a portion (e.g., ½) of the load current, $I_{LOAD}$, into the load 120. And because the portion of load current that each power supply provides is below the threshold current, the first power supply 115A and the second power supply 115B exit from their respective hiccup modes of operation.

Figure 6:
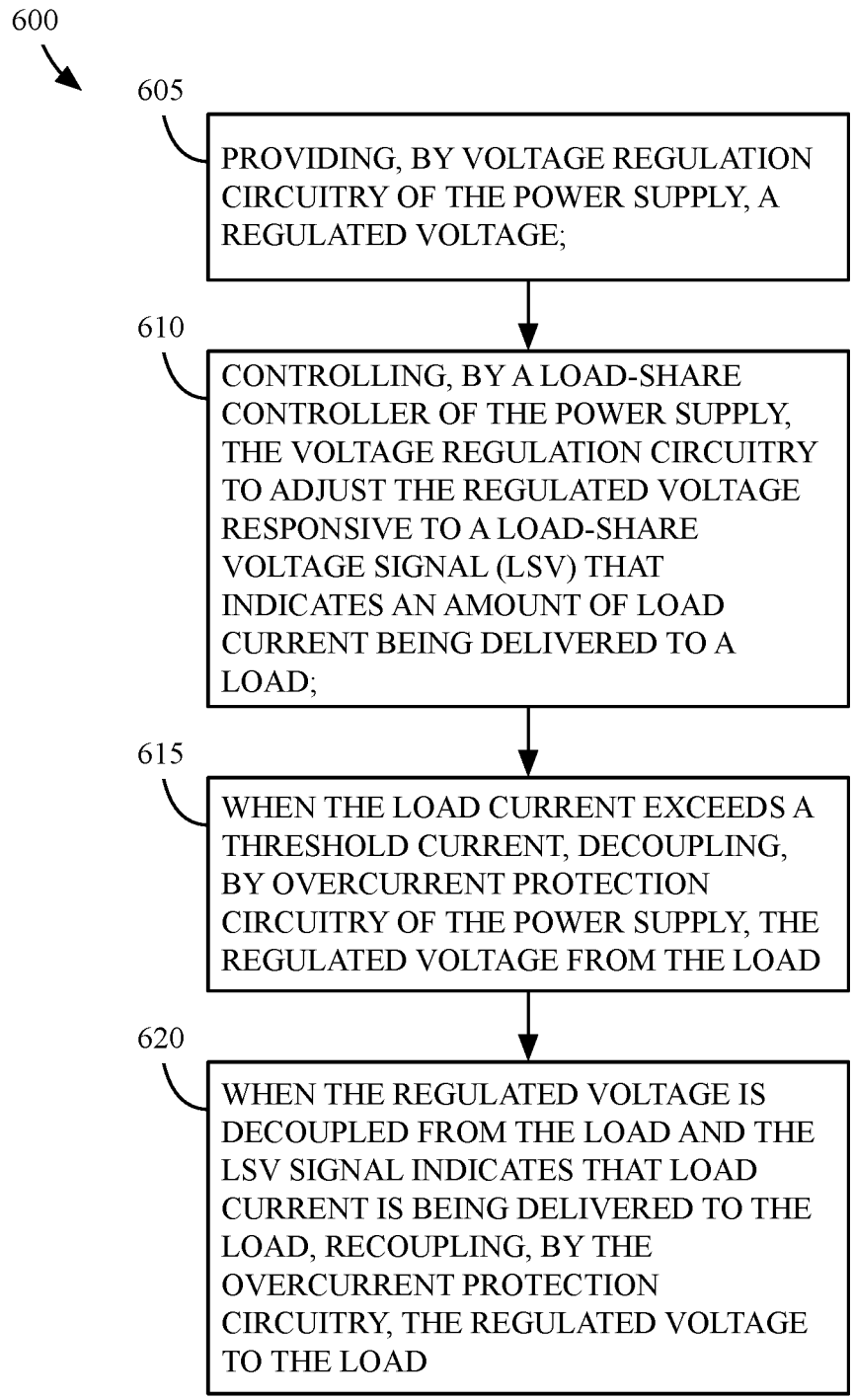
FIG. 6 illustrates operations performed by one or more of the systems described herein that facilitate hiccup mode recovery due to an overcurrent event, in accordance with example embodiments.

FIG. 6 illustrates examples of operations 600 performed by one or more of the systems described herein that facilitate hiccup mode recovery due to an overcurrent event. Examples of the operations at block 605 involve providing, by voltage regulation circuitry 205 of a power supply 115, a regulated voltage.

Examples of the operations at block 610 involve controlling, by a load-share controller 210 of the power supply 115, the voltage regulation circuitry 205 to adjust the regulated voltage responsive to a load-share voltage signal (LSV) that indicates an amount of load current being delivered to a load 120.

Examples of the operations at block 615 involve decoupling, by the overcurrent protection circuitry 215, the regulated voltage from the load 120 when the load current exceeds a threshold current.

Examples of the operations at block 620 involve, when the regulated voltage is decoupled from the load 120, and the LSV signal indicates that load current is being delivered to the load 120 by a different power supply, recoupling, by the overcurrent protection circuitry 215, the regulated voltage to the load 120.

In some examples of the operations, when the regulated voltage is decoupled from the load 120, and the LSV signal indicates that no load current is being delivered to the load 120, the operations further involve recoupling, by the overcurrent protection circuitry 215, the regulated voltage to the load 120 after a predetermined amount of time.

Some examples of the operations involve maintaining, by the overcurrent protection circuitry 215, the regulated voltage in a decoupled state after a predetermined number of attempts to couple the regulated voltage to the load 120 have occurred during a predetermined amount of time, and to recouple the regulated voltage to the load after a predetermined amount of time.

Some examples of the operations involve waiting, by the overcurrent protection circuitry 215, for at least a predetermined amount of time before decoupling the regulated voltage from the load 120.

Some examples of the operations involve comparing, by the overcurrent protection circuitry 215, the LSV signal to a predetermined value associated with the threshold current to determine whether the load current exceeds the threshold current.

Some examples of the operations involve sensing, by the load-share controller 210, a current associated with the regulated voltage that is being delivered by the voltage regulation circuitry 205 to the overcurrent protection circuitry 215 and outputting, by the load-share controller 210, an LSV signal that is proportional to the sensed current.

In some examples, the voltage regulation circuitry 205 comprises switching voltage regulator circuitry.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A power supply comprising:
  voltage regulation circuitry configured to output a regulated voltage;
  a load-share controller configured to control the voltage regulation circuitry to adjust the regulated voltage responsive to a load-share voltage signal (LSV) that indicates an amount of load current being delivered to a load; and
  overcurrent protection circuitry configured to selectively couple the regulated voltage to the load, wherein when the load current exceeds a threshold current, the overcurrent protection circuitry is configured to decouple the regulated voltage from the load, wherein when the regulated voltage is decoupled from the load and the LSV signal indicates that load current is being delivered to the load by a different power supply, the overcurrent protection circuitry is configured to recouple the regulated voltage to the load.

2. The power supply according to claim 1, wherein when the regulated voltage is decoupled from the load, and the LSV signal indicates that no load current is being delivered to the load, the overcurrent protection circuitry is configured to recouple the regulated voltage to the load after a predetermined amount of time.

3. The power supply according to claim 1, wherein the overcurrent protection circuitry is configured to maintain the regulated voltage in a decoupled state after a predetermined number of attempts to recouple the regulated voltage to the load have occurred during a predetermined amount of time, and to recouple the regulated voltage to the load after the predetermined amount of time.

4. The power supply according to claim 1, wherein the overcurrent protection circuitry is configured to wait for at least a predetermined amount of time before decoupling the regulated voltage from the load.

5. The power supply according to claim 1, wherein the overcurrent protection circuitry is configured to compare the LSV signal to a predetermined value associated with the threshold current to determine whether the load current exceeds the threshold current.

6. The power supply according to claim 1, wherein the load-share controller is configured to sense a current associated with the regulated voltage that is being delivered by the voltage regulation circuitry to the overcurrent protection circuitry and to output an LSV signal that is proportional to the sensed current.

7. The power supply according to claim 1, wherein voltage regulation circuitry comprises switching voltage regulator circuitry.

8. A computing system comprising:
one or more processors;
one or more memories for storing instructions code that is executable by the one or more processors for controlling the computing system to perform one or more operations; and
a plurality of power supplies configured to be electrically coupled in parallel to one another to supply power to a load that comprises at least one of the one or more processors, wherein each power supply comprises:
voltage regulation circuitry configured to output a regulated voltage;
a load-share controller configured to control the voltage regulation circuitry to adjust the regulated voltage responsive to a load-share voltage signal (LSV) that indicates an amount of load current being delivered to the load; and
overcurrent protection circuitry configured to selectively couple the regulated voltage to the load, wherein when the load current exceeds a threshold current, the overcurrent protection circuitry is configured to decouple the regulated voltage from the load, wherein when the regulated voltage is decoupled from the load and the LSV signal indicates that load current is being delivered to the load by a different power supply, the overcurrent protection circuitry is configured to recouple the regulated voltage to the load.

9. The computing system according to claim 8, wherein when the regulated voltage is decoupled from the load, and the LSV signal indicates that no load current is being delivered to the load, the overcurrent protection circuitry is configured to recouple the regulated voltage to the load after a predetermined amount of time.

10. The computing system according to claim 8, wherein the overcurrent protection circuitry is configured to maintain the regulated voltage in a decoupled state after a predetermined number of attempts to couple the regulated voltage to the load have occurred during a predetermined amount of time, and to recouple the regulated voltage to the load after the predetermined amount of time.

11. The computing system according to claim 8, wherein the overcurrent protection circuitry is configured to wait for at least a predetermined amount of time before decoupling the regulated voltage from the load.

12. The computing system according to claim 8, wherein the overcurrent protection circuitry is configured to compare the LSV signal to a predetermined value associated with the threshold current to determine whether the load current exceeds the threshold current.

13. The computing system according to claim 8, wherein the load-share controller is configured to sense a current associated with the regulated voltage that is being delivered by the voltage regulation circuitry to the overcurrent protection circuitry and to output an LSV signal that is proportional to the sensed current.

14. The computing system according to claim 8, wherein voltage regulation circuitry comprises switching voltage regulator circuitry.

15. A method for operating a power supply, the method comprising:
providing, by voltage regulation circuitry of the power supply, a regulated voltage;
controlling, by a load-share controller of the power supply, the voltage regulation circuitry to adjust the regulated voltage responsive to a load-share voltage signal (LSV) that indicates an amount of load current being delivered to a load;
when the load current exceeds a threshold current, decoupling, by overcurrent protection circuitry of the power supply, the regulated voltage from the load; and
when the regulated voltage is decoupled from the load, and the LSV signal indicates that load current is being delivered to the load by a different power supply, recoupling, by the overcurrent protection circuitry, the regulated voltage to the load.

16. The method according to claim 15, wherein when the regulated voltage is decoupled from the load, and the LSV signal indicates that no load current is being delivered to the load, the method further comprises recoupling, by the overcurrent protection circuitry, the regulated voltage to the load after a predetermined amount of time.

17. The method according to claim 15, further comprising maintaining, by the overcurrent protection circuitry, the regulated voltage in a decoupled state after a predetermined number of attempts to couple the regulated voltage to the load have occurred during a predetermined amount of time, and to recouple the regulated voltage to the load after the predetermined amount of time.

18. The method according to claim 15, further comprising waiting, by the overcurrent protection, for at least a predetermined amount of time before decoupling the regulated voltage from the load.

19. The method according to claim 15, further comprising comparing, by the overcurrent protection circuitry, the LSV signal to a predetermined value associated with the threshold current to determine whether the load current exceeds the threshold current.

20. The method according to claim 15, further comprising:
- sensing, by the load-share controller, a current associated with the regulated voltage that is being delivered by the voltage regulation circuitry to the overcurrent protection circuitry; and
- outputting, by the load-share controller, an LSV signal that is proportional to the sensed current.

* * * * *